(12) United States Patent
Svensson

(10) Patent No.: US 6,427,537 B1
(45) Date of Patent: Aug. 6, 2002

(54) MEASURING EQUIPMENT

(76) Inventor: Nils Christer Svensson, Sunnavagan 11, SE 146 40, Tullinge (SE)

( * ) Notice: Subject to any disclaimer, the term of this patent is extended or adjusted under 35 U.S.C. 154(b) by 0 days.

(21) Appl. No.: 09/647,843

(22) PCT Filed: Apr. 7, 1999

(86) PCT No.: PCT/SE99/00569
§ 371 (c)(1),
(2), (4) Date: Dec. 5, 2000

(87) PCT Pub. No.: WO99/53326
PCT Pub. Date: Oct. 21, 1999

(30) Foreign Application Priority Data

Apr. 8, 1998 (SE) .............................................. 9801247

(51) Int. Cl.[7] ...................... G01M 13/02; G01M 13/04; G01N 29/12
(52) U.S. Cl. ........................................... 73/660; 702/56
(58) Field of Search .................. 73/658, 659, 660, 73/661; 702/56

(56) References Cited

U.S. PATENT DOCUMENTS

| 4,134,303 A | * | 1/1979 | Davis ........................... 73/660 |
| 4,135,244 A | * | 1/1979 | Davis ........................... 700/280 |
| 4,426,641 A | * | 1/1984 | Kurihara et al. ............. 340/681 |
| 4,435,770 A | * | 3/1984 | Shiohata et al. ............. 700/279 |
| 4,453,407 A | * | 6/1984 | Sato et al. ..................... 702/56 |
| 5,365,787 A | * | 11/1994 | Hernandez et al. ..... 324/207.25 |
| 5,445,028 A | | 8/1995 | Bianchi et al. |
| 5,502,650 A | * | 3/1996 | Naruse et al. ............... 700/279 |
| 5,511,422 A | | 4/1996 | Hernandex |
| 5,610,339 A | | 3/1997 | Haseley et al. |
| 6,026,348 A | * | 2/2000 | Hala ........................... 702/126 |

FOREIGN PATENT DOCUMENTS

GB          2177509          1/1987

* cited by examiner

Primary Examiner—Hezron Williams
Assistant Examiner—Rose M. Miller
(74) Attorney, Agent, or Firm—Banner & Witcoff, Ltd.

(57) ABSTRACT

The present invention relates to measuring equipment (1) that includes at least two sensors (2, 3), each being adapted to sense a measurement magnitude, a measuring card (6) to which said sensors (2, 3) are coupled, and a computer unit to which the measuring card is coupled. At least one of the sensors (2) is adapted to sense prevailing frequencies of an object (11) to be measured. At least one of the sensors (3) is adapted to evaluate prevailing tacho-pulses of an object (11) to be measured. The circuits in said measuring card (16) are adapted to evaluate prevailing sound and vibrations generated by the rotating object (11) in response to information received with respect to prevailing frequency and prevailing tacho-pulses, by dividing the time distance between two tacho-pulses into a number of sub-sections and generating a circuit-internal tacho-signal for each sub-section.

11 Claims, 4 Drawing Sheets

MEASURING EQUIPMENT

FIELD OF INVENTION

The present invention relates generally to measuring equipment and more particularly to measuring equipment of the kind that includes a plurality of sensors which are each adapted to sense a measurement magnitude, and which further include a "measuring card" to which said sensors are connected, and a computer unit to which said measuring card is connected.

The invention may be based on providing said measuring card with two mutually opposite electrical contact means, of which a first is adapted for coaction with a corresponding electrical contact means belonging to a computer unit, and the other is adapted for coaction with a corresponding sensor-mounted electrical contact means and thereby create conditions to form a simple and light measuring equipment that can be brought along by a mechanic or repairman in order to evaluate an imbalance or balance of a rotating machine or shaft on site.

The invention also includes the embodiment where a rotating machine can be continuously controlled with regards to balance or imbalance by including the measuring card in a controlling unit and/or process-regulating unit and to thereby integrate the measuring equipment with the unit.

The inventive measuring equipment is based on adapting a first sensor to sense a prevailing frequency generated by an object to be measured, while a second sensor is adapted to sense prevailing tacho-pulses generated by the object being measured.

More particularly, the measured object includes a rotating object, such as a shaft or axle, and the measuring equipment functions to enable an evaluation of different types of imbalance in the rotary movement of the rotating object from measurements received from the rotation of the object, such as a result of cracks in the object, rotational asymmetric imbalances, varying degrees of imperviousness in the material from which the object is made, and so on.

BACKGROUND OF THE INVENTION

Various designs and configurations of measuring equipment of the aforedescribed kind are known to the art.

For instance, there is known to the art measuring equipment that includes one or more sensors for sensing one or more temperatures with the aid of a measuring card and a computer unit to this end.

One such measuring card is marketed in Sweden under the designation Ines DMM & DAQ I218 by PC Card Distribution Skandinavien AB, Solna, Sweden.

Measuring equipment of this kind thus enables one or more prevailing or current temperatures to be presented on the screen of the computer unit.

It is also known to configure a measuring card of this kind as a digital multimeter having a determined digital resolution or a 16-channel data collecting system.

In this regard, there is also provided a data collection of analogue levels with 24-bit resolution.

The measuring cards are comprised of an A/D converter and a digital electronic unit, among other things.

It is also known to enter into the computer unit information relating to the front surface of a known measuring unit and to present relevant, or current, values such as temperature values, within the area of the presentation surface of said measuring unit.

Patent Publication GB-A-2 177 509 teaches a method and an arrangement for detecting axial cracks in a rotor of rotary machines, by sensing vibration frequencies with the aid of sensors (38, 40) and correlating the frequency of the vibrations with the angular position of the rotor with the aid of a sensor (37).

Data relating to angular velocity is obtained through the medium of a cogwheel (35) and a magnetic sensor (37), said cogwheel (35) having ten equidistant teeth and therewith producing a detectable tacho-pulse at each 36th degree of rotation.

Patent Publication U.S. Pat. No. 5,610,339 teaches a method of evaluating and anticipating the conditions of a machine that includes at least one rotary element, with the aid of a vibration sensor (12) and a tacho-pulse sensor (14).

SUMMARY OF THE INVENTION

Technical Problems

When taking into consideration the technical deliberations that a person skilled in this particular art must make in order to provide a solution to one or more technical problems that he/she encounters, it will be seen that on the one hand it is necessary initially to realise the measures and/or the sequence of measures that must be undertaken to this end, and on the other hand to realise which means is/are required in solving one or more of said problems. On this basis, it will be evident that the technical problems listed below are highly relevant to the development of the present invention.

It will be understood that by the term tacho-signals as used in the following description is meant the tacho-signals that are generated or formed internally in the measuring equipment and that are required for evaluation of the measuring result. These tacho-signals have a higher frequency than tacho-signal initiating pulses, abbreviated to tacho-pulses, this expression being understood as meaning tacho-signals that are formed via a tacho-pulse receiving and controlling sensor.

When considering the present state of the art as described above, it will be evident that a technical problem resides in creating with a starting point from the basic features of the known technology conditions which will enable the measuring equipment to create conditions, with the aid of simple means, so as to obtain the tacho-signals generated in internal circuits and necessary to the measuring process through the medium of signal processing and by increasing the frequency of received tacho-pulses, in addition to evaluating prevailing sound and other vibrations generated by a rotating object, such as an electric motor, a petrol-driven or diesel-driven engine, and like machines as well as driven rotating objects, such as pumps, separators and like objects.

Another technical problem is one of enabling well-defined tacho-signals to be obtained with the aid of simple means, even in respect of objects that have not been provided with means for generating a large number of tacho-pulses during one revolution of the rotating object (such as a cogwheel), but which, nevertheless, have a readily accessible rotatable surface part, such as an exposed rotatable shaft or axle.

Another technical problem resides in realising the advantages that are afforded by applying to an accessible, rotatable surface-part one or more markings, preferably only one single marking, for generating tacho-pulses, and sensing said marking/s as it passes a few, preferably one, sensor while, nevertheless, sending to the measuring equipment a far greater number of tacho-signals for calculating purposes, through the medium of internal circuitry. Another problem in this respect resides in realising the means required to this end.

Another technical problem is one of realising the significance of and the advantages afforded by enabling an electronic unit to divide the time distance between two mutually sequential tacho-pulses into a predetermined number of sub-section, each having mutually the same duration, and generating a pulse-like tacho-signal with each such sub-section.

Another technical problem is one of realising the significance of and the advantages afforded by observing that the duration of the sub-sections can be varied in response to the speed at which the object rotates.

Yet another technical problem is one of realising the significance of and the advantages afforded by selecting only a few tacho-pulses for each revolution, say one pulse per revolution, and causing the circuit-internal electronics to perform the necessary, uniform division of the time distance between the tacho-pulses.

Another technical problem is one of realising the significance of allowing the number of time divisions, and therewith the number of tacho-signals per revolution, to be sixteen or thirty-two and therewith simplify signal processing in the computer unit.

A particular technical problem resides in realising the significance of and the advantages afforded by utilising a calculated duration for each sub-section evaluated between a first tacho-pulse and a second tacho-pulse between said second tacho-pulse and a subsequent third tacho-pulse.

Still another technical problem is one of realising the significance of and the advantages afforded by evaluating a prevailing frequency during each of said sub-sections in the electronic unit associated with said measuring card.

Yet another technical problem is one of realising the significance of and the advantages afforded by evaluating prevailing sound and vibrations and entering these into the computer unit in a structured state.

A further technical problem is one of realising the significance of and the advantages afforded by adapting the computer unit so as to show on its display the front surface of a known measuring unit intended for the same purpose, and to present prevailing measurement values obtained with the measuring equipment in the region of the presentation surface of said known measuring unit.

In respect of the above application, a further technical problem resides in realising the significance of utilising two different types of sensor through the medium of a measuring card, of which one sensor is adapted to sense continuously prevailing frequencies generated by an object being measured, and the other of which is adapted to sense tacho-pulses generated by said object.

Another technical problem is one of realising the significance of and the advantages afforded by adapting circuits in said measuring card and co-ordinating said circuits such that the circuits can be co-ordinated equally on the basis of information received with respect to prevailing frequency and prevailing tacho-pulses, essentially regardless of the speed at which the object rotates and also during significantly varying rotational speeds, such as during acceleration and retardation phases of said rotation.

The present invention utilises a measuring card that includes an A/D converter and a digital electronic unit. In this regard, it will be seen that a technical problem resides in realising the significance of and the advantages afforded by coupling the analogue information relating to prevailing frequencies to the A/D converter, and by coupling information relating to the time positions of prevailing tacho-signals directly to the electronic unit.

Solution

With the intention of solving one or more of the aforesaid technical problems, the present invention takes as its starting point measuring equipment of the kind defined in the introduction.

According to the invention, at least one of the sensors shall be adapted to sense continuously the prevailing, or current, frequency of an object being measured, and at least one sensor will be adapted to sense tacho-pulses of an object being measured, and the circuitry in a measuring card will be adapted to evaluate prevailing sound and vibrations generated by the rotating object, on the basis of information received concerning prevailing frequency and prevailing tacho-pulses. By prevailing is meant currently occurring.

It is particularly proposed in accordance with the present invention that the electronic unit shall be adapted to divide the time distance between two mutually sequential tacho-pulses into a predetermined number of sub-sections and to generate a tacho-signal at each sub-section, through the medium of calculating circuits.

In accordance with preferred embodiments, the sub-sections are given equal duration in time, and the duration of each sub-section evaluated between a first tacho-pulse and a second tacho-pulse shall be utilised within the time distance between said second tacho-pulse and a following third tacho-pulse.

This creates conditions for allowing a prevailing frequency section to be evaluated in said electronic unit during each of said sub-sections, said electronic unit being conveniently adapted to evaluate prevailing sound and vibrations by frequency analysis, and entering said sound and vibrations into the computer unit.

According to preferred embodiments that lie within the scope of the inventive concept, the present invention also utilises a measuring card that includes an A/D converter and a digital electronic unit. Continuous analogue information relating to prevailing frequency is applied to the A/D converter, and information relating to prevailing tacho-pulses is applied to the electronic unit.

In accordance with the invention, the computer unit is adapted to show on its display unit the front surface of a known measuring unit and to present prevailing measuring values in the region of the presentation area of the known measuring unit, said known unit being adapted for the same purpose.

Advantages

Those advantages that are primarily characteristic of inventive measuring equipment reside in the provision of conditions which enable prevailing sound and vibrations generated by a rotating object to be readily evaluated with the aid of two different types of sensors, both of which are connected directly to a measuring card.

The measuring card may have the advantage of containing all measuring electronics for sensor current supply, and a large number of sensors having integrated electronic circuitry can be coupled to the measuring card.

Circuits embodied in the measuring card can be used to evaluate prevailing sound and vibrations generated by the rotating object.

A particular advantage afforded by the invention is that sensed tacho-pulses are chosen for each revolution and the time distance between sequential tacho-pulses is divided electronically, so as to generate internally of the measuring equipment tacho-signals whose frequencies are higher than the frequencies of the tacho-pulses.

The primary characteristic features of inventive measuring equipment are set forth in the characterising clause of Claim 1.

BRIEF DESCRIPTION OF THE DRAWINGS

The invention will now be described in more detail with reference to an exemplifying embodiment at present preferred having features characteristic of the present invention, and also with reference to the accompanying drawing, in which.

DESCRIPTION OF EMBODIMENTS AT PRESENT PREFERRED

Figure 1:
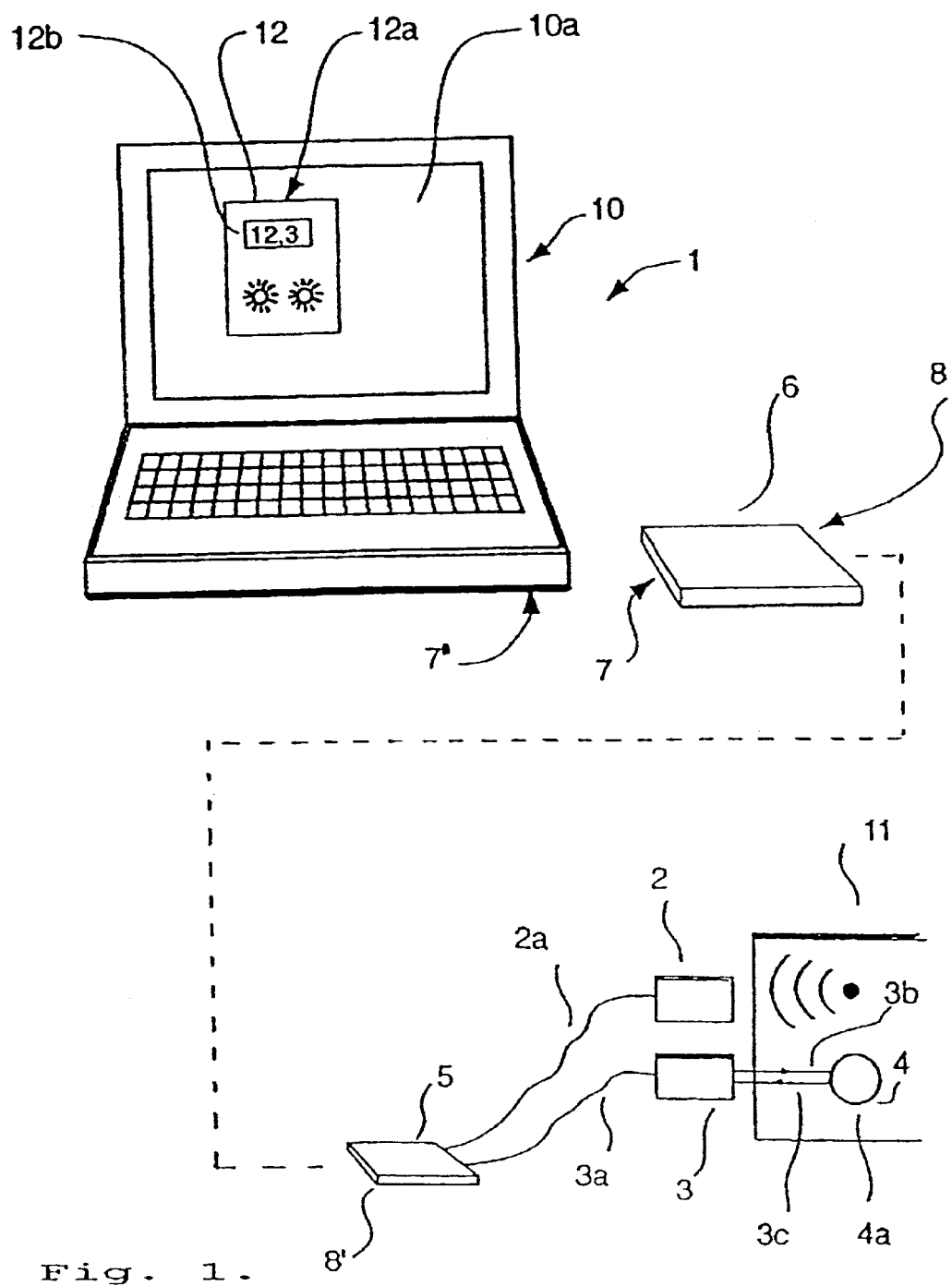
FIG. 1 is a perspective view of a portable computer unit and an exploded view of a measuring card, electrical contact means that coact with two sensors each adapted to evaluate respectively sound and vibrations generated by a rotating object, and tacho-pulses received from the object.

Shown in FIG. 1 is a measuring equipment 1 which includes two or more sensors, in the illustrated case a first sensor 2 and a second sensor 3.

The first sensor 2 is adapted to sense continuously a measuring magnitude or parameter, in the form of sound, whereas the second sensor 3 is adapted to sense tacho-pulses generated by a rotating shaft or axle 4.

The sensors 2 and 3 are connected to an electrical contact means 5 through a respective line 2a and 3a.

A measuring card 6 is used to form a communications link between a computer unit 10 and the sensors 2, 3, through the medium of said electrical contact means 5.

From a mechanical aspect, the measuring card 6 includes two mutually opposite electrical contact means 7, 8, of which a first contact means 7 is adapted for coaction with a corresponding computer-mounted contact means 7', provided in the bottom of a pocket adapted to receive the measuring card, and a second electrical contact means 8 is adapted for coaction with a corresponding electrical contact means 8' provided in the electrical contact means 5 and coacting with the sensor 2.

The sensor 2 is adapted to take-up sound and vibrations continuously from the object 11 being measured, such as an electric motor, and receives analogue signals continuously delivered via the line 2a through the electrical contact means 5 and into the measuring card 6.

It will be understood that the rotating object 11 need not be an electric motor, but may be a petrol-driven or diesel-driven motor, a gearbox, or some like device.

The sensor 3 is adapted to be able to sense tacho-pulses from the rotating shaft or axle 4.

The rotatable shaft 4 of the illustrated object 11 in the present embodiment need not include a cog wheel or drive splines, but may be completely circular and a small mark may be applied to the shaft or axle immediately prior to the measuring process, for instance a mark made on a piece of adhesive material and simply stuck onto the shaft.

According to a particular embodiment, this is effected by placing on the peripheral surface of the shaft 4 a single, short mirror surface 4a which functions to reflect a light beam 3b emitted from the sensor 3 back to said sensor 3 in the form of a reflected light beam 3c once with each revolution of the shaft 4, these tacho-pulses being transmitted to the measuring card 6 via the line 3a and the electrical contact device 5.

Circuits provided in the measuring card 6 are adapted to evaluate the current sound and vibrations generated by the rotating object 4, on the basis of information received concerning the frequency and the tacho-pulses concerned, one pulse per revolution.

Figure 2:
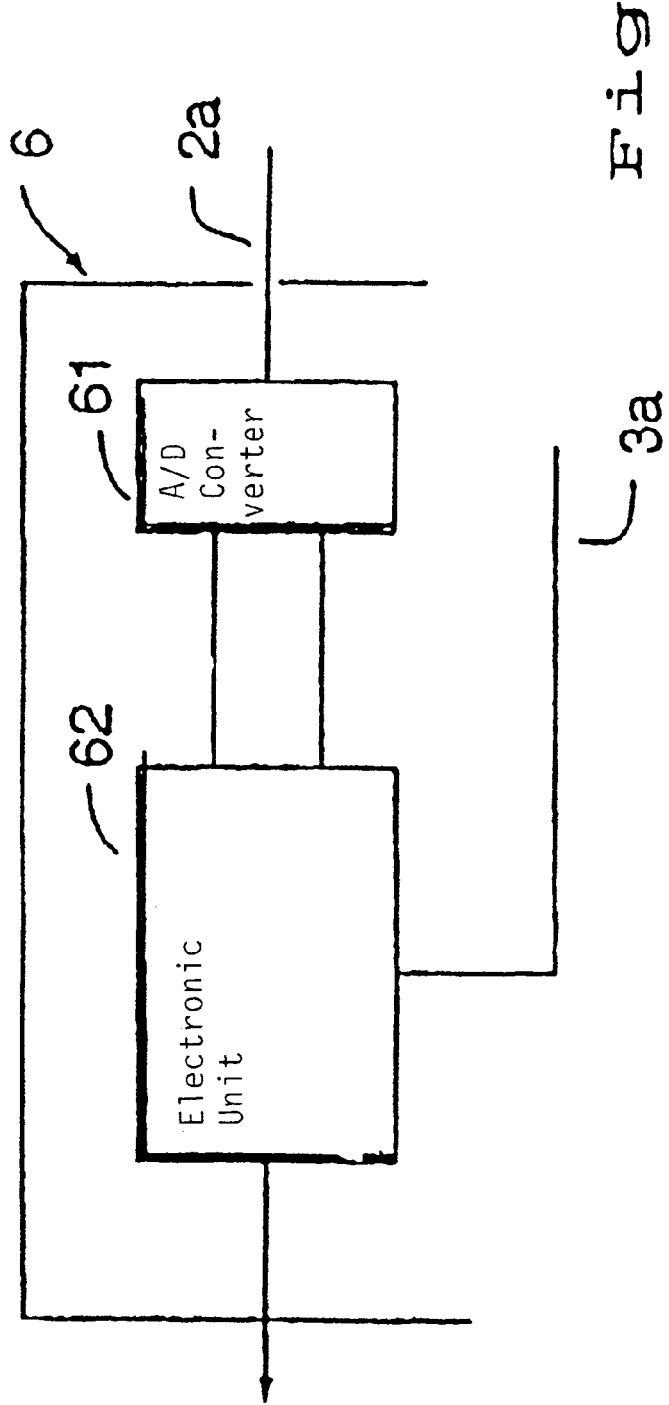
FIG. 2 is a highly simplified block diagram illustrating schematically selected circuits in the measuring card.

As shown in FIG. 2, the measuring card 6 includes an A/D-converter 61 and a digitally operating electronic unit 62, where the analogue signal on the line 2a relating to the prevailing frequency is connected to the A/D-converter 61 where as the information relating to prevailing tacho-pulses is connected to the electronic unit 62, via the line 3a.

It will be understood that a measuring card 6 will also include other circuits. However, since these circuits are unessential to an understanding of the present invention, they will not be described.

With regard to tacho-pulses on the line 3a, it will be noted that in the case of this practical application the time distance between two mutually sequential tacho-pulses is much too long for these tacho-pulses to be utilised directly as circuit-internal tacho-signals necessary for evaluating the measuring result. In order to provide an accurate evaluation of the measuring result, circuit arrangements require access to tacho-signals that have a much higher frequency than the tacho-pulses obtained via the line 3c.

Figure 3:
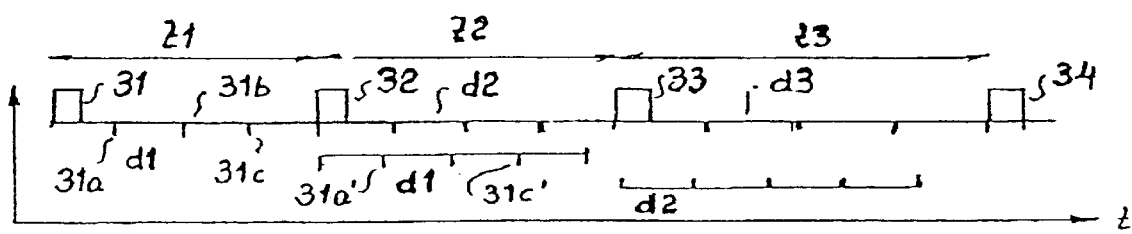
FIG. 3 is a pulse-time diagram illustrating closely adjacent tacho-pulses generated at different rotational speeds of the object.

In the FIG. 3 diagram, three time distances between four mutually sequential tacho-pulses 31, 32, 33, 34 are designated t1, t2 and t3, these time-wise occurring pulses being in response to the rotational speed of the shaft or axle 4. At a low speed, the time distance t1 will be greater than at a high speed, while the duration of the tacho-pulses will be slightly shorter at the same time.

FIG. 3 shows the time-wise occurrence of sensed tacho-pulses 31, 32, 33, 34 and the time-wise division of the circuit-internal tacho-signals 31a, 31b, 31c . . . during a retardation phase, and the principles of the invention will now be described in more detail with reference to FIG. 3 although it will be understood that the measures applied in accordance with the invention are applicable at a constant rotational speed and during an acceleration phase.

The electronic unit 62 is adapted to measure and establish the time distance, such as t1, between the front pulse edges of two mutually sequential tacho-pulses 31 and 32, such as time spacing t1.

Figure 4:
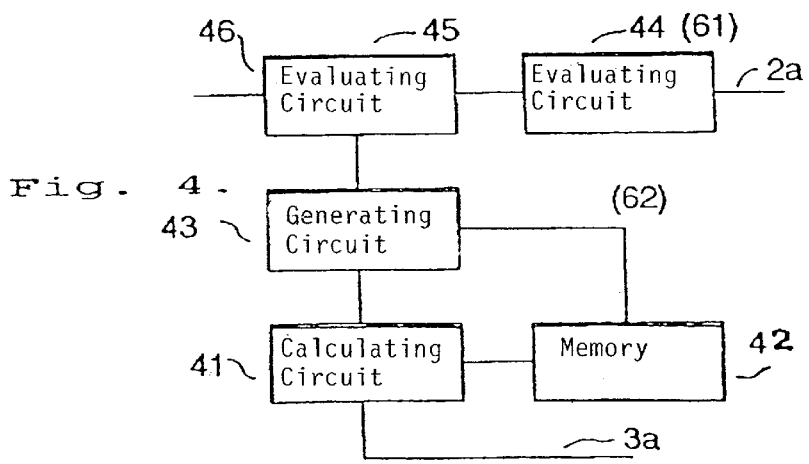
FIG. 4 is a block schematic illustrating different circuits in said electronic unit.

FIG. 4 is intended to show that information relating to the tacho-pulses and the evaluation of the time distances t1, t2 and t3 respectively is carried out in a first calculating circuit 41 in which the time distance (t1) between two mutually sequential tacho-pulses 31, 32 is divided into a predetermined number of sub-sections d1 of equal duration.

Although only four (4) sub-sections have been shown in FIG. 3 for the sake of simplicity, it will be understood that in practice a much larger number of sub-sections can conveniently be chosen, such as thirty-two (32).

The duration of each sub-section relating to the time t1 between the pulses 31 and 32 has been designated d1 in FIG. 3, while corresponding time-sections of longer duration and relating to time t2 between the pulses 32 and 33 have been designated d2.

Correspondingly, the duration for each sub-section relating to time t3 between the pulses 33 and 34 has been designated d3.

The time-section d1 is thus shorter than d2, which is shorter than d3, and so on.

It can be ascertained, however, that the durations d1, d2 and d3 will correspond to the same angular rotation of the shaft or axle 4 of the rotating object 11.

The invention is now based initially on evaluating the duration d1 of each sub-section through the medium of a chosen division of the duration t1 between a first tacho-pulse 31 and a second tacho-pulse 32, and storing this duration d1 in a memory 42 with time-positions 31a, 31b, 31c and so on.

The stored time value d1 shall now be used as a chosen magnitude for a subsequent calculation relating to the time distance between a second tacho-pulse 32 and a subsequent third tacho-pulse 33.

The invention is then based on the use of the duration (d1), identical for the four time-sections within the time t1, as a sub-section during the time t2, and evaluating the duration for each sub-section d2 to be used for the calculation during following time-sections d3 between the pulses 33 and 34, and so on, during the time-section t2.

A circuit 43 reads from the memory 42 the constant duration (d1) that shall apply during a chosen number of sub-sections of the time-section t2, and generates a tacho-signal 31a', 31b', 31c' and so on for each sub-section, these tacho-signals being used to "sample" the frequency curve from the sensor 2.

The frequency spectrum on the line 2a is evaluated in a circuit 44 in a known manner during the chosen number of subsections.

Thus, the relevant continuously evaluated frequency on the line 2a can be evaluated during each of said sub-sections (the time-section d1 during d2; d2 during t3) in the circuit 45 in said electronic unit 62 and is evaluated via the circuit 45, whereas a chosen frequency analysis, prevailing sound and vibrations, and information corresponding thereto is delivered to the computer unit 10 via a line 46 and via the electric contact means 7, 7'.

The computer 10 is adapted to display on its screen 10a, through the medium of an internal computer program, the whole of the front surface 12a of an earlier known measuring unit 12 that is adapted for the same purpose.

The prevailing sound and vibration measurement values generated by the rotating object 11 are presented in the region 12b of the presentation surface of the measuring unit 12.

Other methods of evaluating the useful time-distance d3 within mutually sequential time-sections also lie within the scope of the present invention.

One example in this respect is when $$d3 = d2 + (d2 - d1).$$

This function may include integers from 4 to 64, preferably from 8 to 16, depending on whether fundamental frequencies and/or harmonics shall be evaluated, such as 32 at the 5th harmonic.

Although the illustrated embodiment has been described with reference to one tacho-pulse with each revolution, it will be understood that even though the invention is based on the concept of using only a few tacho-pulses per revolution, the number of tacho-pulses can be increased to at least two, three or four, although with a high precision requirements.

Although the inventive principle can be applied with more tacho-pulses than the aforesaid numbers, it is less practical to increase the number of tacho-pulses over the aforesaid four pulses.

It will also be understood that the functional blocks shown in FIGS. 2 and 4 can be implemented through the medium of software.

Figure 5:
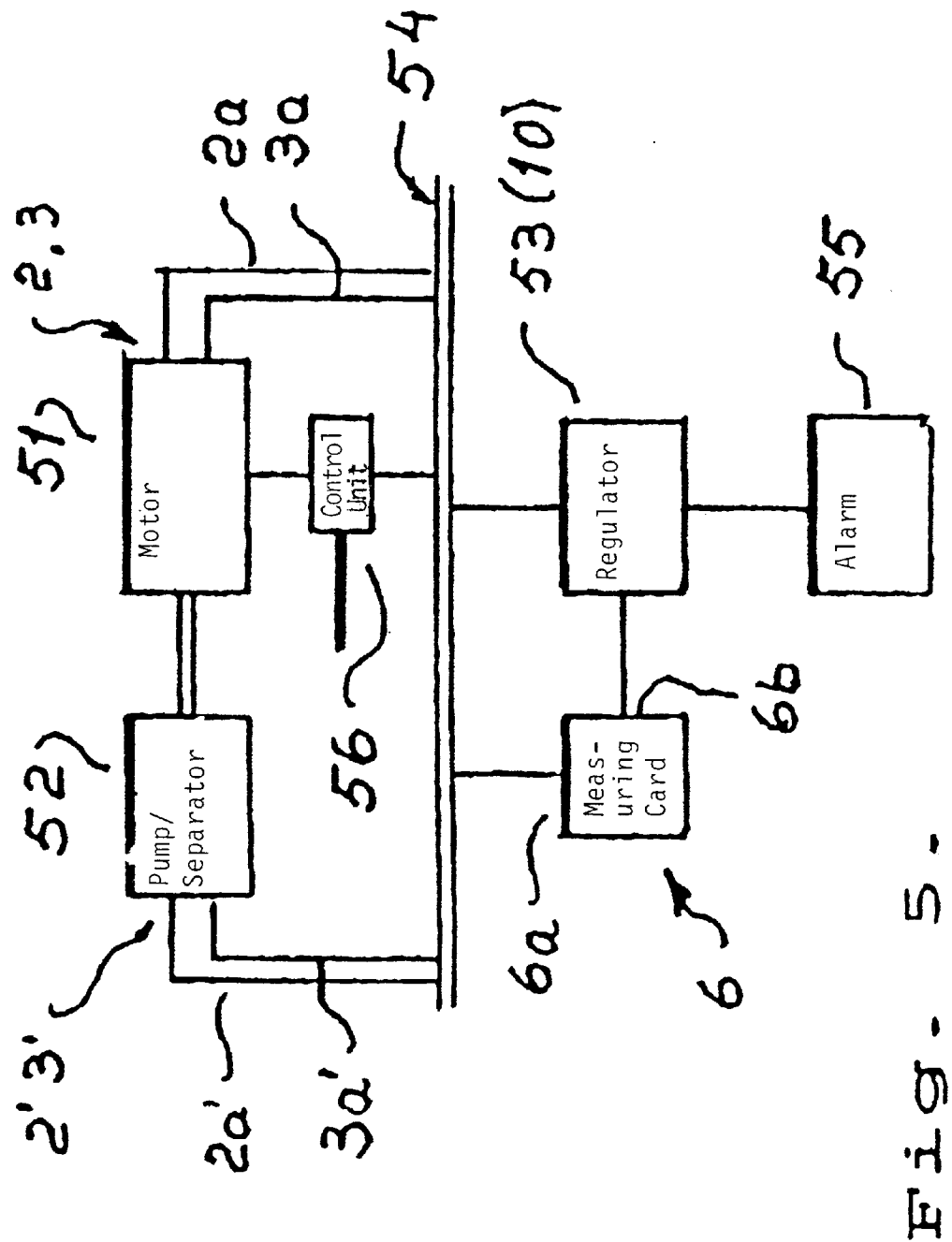
FIG. 5 is a block schematic illustrating a stationary application of a measuring equipment according to the present invention.

A more stationary application is described with reference to FIG. 5 where an electrical motor 51 is adapted to drive a pump, a separator, or the like 52. The motor-pump arrangement 51, 52 is controlled by a regulating equipment 53.

Several such arrangements can be co-ordinated to one and the same regulating equipment 53 by means of a bus-system 54.

Two sensors 2, 3 are connected to the bus-system 54 through the lines 2a, 3a and these are adapted to continuously (or discontinuously) detect sounds and vibrations generated by the motor 51.

One or several measuring cards 6 is/are connected to the bus-system 54 and is/are also connected to, or integrated with, the regulating equipment 53.

An alarm-device 55 is activated if values are evaluated that differ from accepted values.

In this application the measuring card 6 presents input- and output-circuits 6a for the bus-system 54 and input- and output-circuits 6b for the regulating equipment 53.

The motor 51 is controlled by a control-unit 56 in order to adapt the power of the motor to prevailing conditions.

It will also be understood that the invention is not restricted to the aforedescribed and illustrated exemplifying embodiment thereof and that modifications can be made within the scope of the inventive concept as defined in the following Claims.

It can thus be said that the previously described embodiments presents a light mobile measuring equipment that can be used for permanent or temporary measurements at objects on separate locations.

Within the scope of the invention is also a more continuous measurement of a stationary object. It is here possible to have the measuring equipment, and specifically a measuring card, integrated with a controlling and/or process-regulating unit. It is thus possible to monitor a pump in order to quickly evaluate a imbalance in the pump-shaft, a separator can be monitored in order to quickly evaluate an imbalance in the separator axle, and so on.

A measuring card according to the invention may thus be used in several different applications. Nothing prevents the transmission of measurement results by means of a bus-system.

What is claimed is:

1. Measuring equipment that includes at least two sensors, each of which is adapted to sense a measuring magnitude or parameter, a measuring card to which said sensors are connected, and a computer unit to which said measuring card is connected, wherein at least one of said sensors is adapted to sense the prevailing frequency of an object to be measured, wherein at least one of said sensors is adapted to sense prevailing tacho-pulses of an object to be measured, and wherein circuits included in said measuring card are adapted to evaluate prevailing sound and vibrations generated by the rotating object in response to received information relating to prevailing frequency and prevailing tacho-pulses, characterised by an electronic unit which is adapted to divide the time distance between two mutually sequential tacho-pulses into a predetermined number of sub-sections and which is also adapted to produce a tacho-signal for each selected sub-section.

2. Measuring equipment according to claim 1, characterised in that the duration of each sub-section evaluated between a first tacho-pulse and a second tacho-pulse is utilised within the time distance between said second tacho-pulse and a following third tacho-pulse.

3. Measuring equipment according to claim 1 in which the measuring card includes an A/D converter and a digital electronic unit, characterised in that analogue information relating to prevailing frequency is applied to the A/D converter, and information relating to prevailing tacho-pulses is applied to the electronic unit.

4. Measuring equipment according to claim 1, characterised in that the electronic unit functions to evaluate prevailing frequency during each of said sub-sections.

5. Measuring equipment according to claim 3, characterised in that said electronic unit is adapted to evaluate prevailing sound and vibrations by frequency analysis, and to enter these measurements into the computer unit.

6. Measuring equipment according to claim 1, characterised in that the computer unit is adapted to display on its display unit the front surface of an earlier known measuring unit constructed to the same end and to present prevailing values in the region of the presentation surface of said measuring unit.

7. Measuring equipment according to claim 3, characterised in that the duration of the sub-sections used is calculated from a number of earlier established sub-sections.

8. Measuring equipment according to claim 1, characterised in that said measuring card is provided with two mutually opposite electrical contact means, that a first electrical contact means is adapted for coaction with a corresponding electrical contact means on the computer unit, and that a second electrical contact means is adapted for coaction with a corresponding sensor-associated electrical contact means.

9. Measuring equipment according to claim 1, characterised in that said measuring card is connected to, or integrated with, a regulating equipment.

10. Measuring equipment according to claim 9, characterised in that one or several sensors for measurements on one or several objects are connected to a bus-system, and that one or several regulating systems also are connected to said bus-system.

11. Measuring card, adapted to be used within a measuring equipment according to claim 1 characterised in that an electronic unit is adapted to divide the time distance between two mutually sequential tacho-pulses into a predetermined number of sub-sections, and adapted to generate a tacho-signal representative for each sub-section.

* * * * *